H. A. HUPPERTZ.
SUPPORT FOR FISHING RODS.
APPLICATION FILED MAY 9, 1917.
1,275,928.
Patented Aug. 13, 1918.
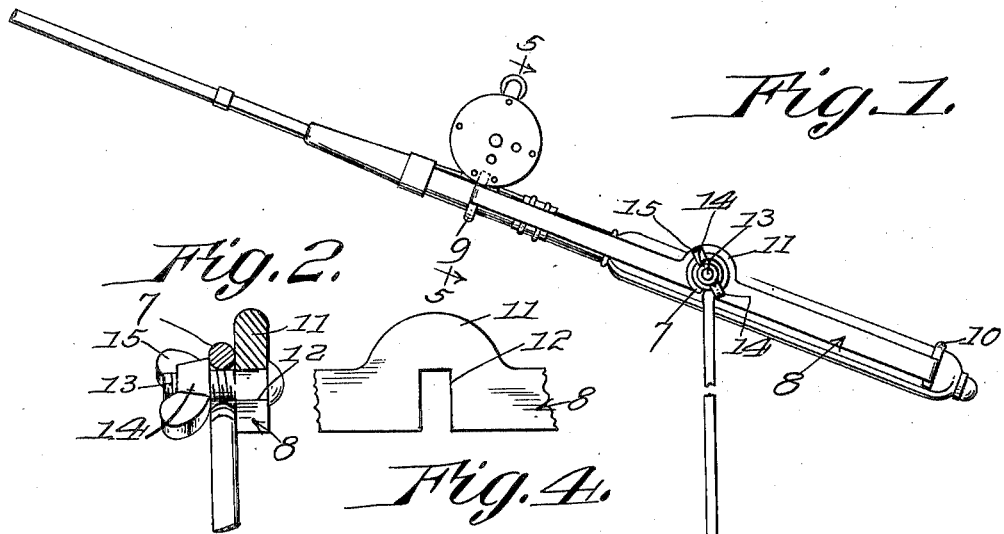
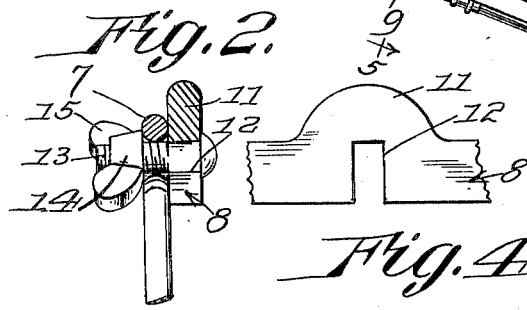
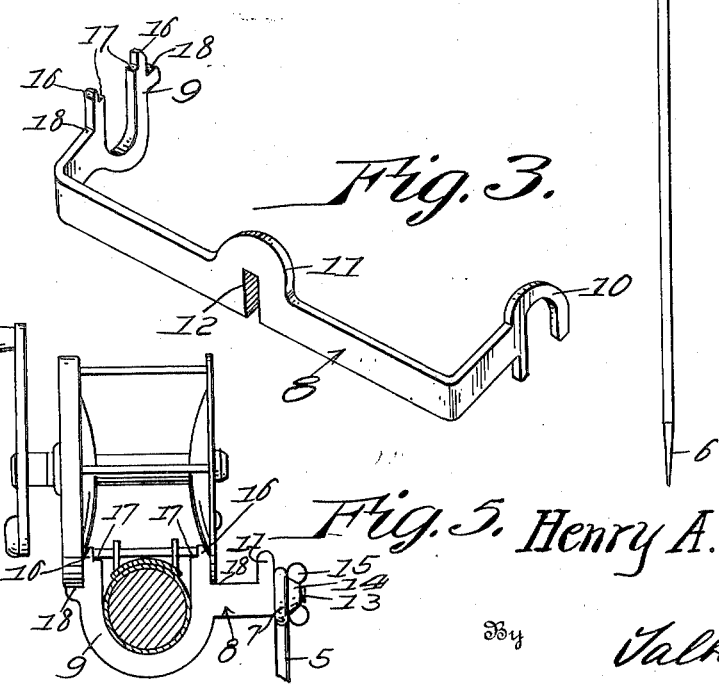
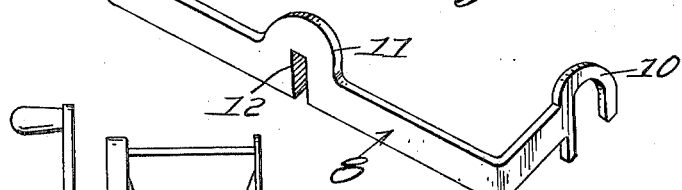
Inventor
Henry A. Huppertz,
By Talbert & Parker
Attorneys

UNITED STATES PATENT OFFICE.

HENRY A. HUPPERTZ, OF CINCINNATI, OHIO.

SUPPORT FOR FISHING-RODS.

1,275,928. Specification of Letters Patent. Patented Aug. 13, 1918.

Application filed May 9, 1917. Serial No. 167,531.

*To all whom it may concern:*

Be it known that I, HENRY A. HUPPERTZ, a citizen of the United States, residing at Cincinnati, in the county of Hamilton and State of Ohio, have invented certain useful Improvements in Supports for Fishing-Rods, of which the following is a specification, reference being had therein to the accompanying drawing.

The invention relates to a support, and more particularly to the class of adjustable supports for fishing rods.

The primary object of the invention is the provision of a support of this character wherein a fishing rod can be held at any desired angular position after the casting of its line, thereby eliminating the holding of the rod in the hand of the user until a bite by the fish on the bait upon the hook is had.

Another object of the invention is the provision of a support of this character wherein the same is provided with a staff or prop which can be anchored in the ground for stationarily mounting the support, and the fishing rod is held in a holder which is adjustably connected to the staff or prop and can be positioned at any desired angle at the option of the user of the support.

A further object of this invention is the provision of a support of this character wherein the holder will permit the locking engagement of the reel upon the rod therewith to prevent the sliding of the rod in the holder during the use of the support.

A still further object of the invention is the provision of a support of this character which is extremely simple in construction, thoroughly reliable and efficient in its purpose, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompany drawing:

Figure 1 is a side elevation of the support constructed in accordance with the invention showing a fishing rod held thereby;

Fig. 2 is a fragmentary vertical transverse sectional view through the support at the point of the joint between the holder for the rod and the staff or prop;

Fig. 3 is a perspective view of the holder for the rod;

Fig. 4 is a fragmentary detail view in side elevation of the holder; and

Fig. 5 is a sectional view on the line 5—5 of Fig. 1.

Similar reference characters indicate corresponding parts throughout the several views of the drawing.

Referring to the drawing in detail, the support comprises a staff or prop 5 preferably made from metal having the required rigidity and strength and is formed with a pointed lower end 6 which is adapted to penetrate a distance in the ground for the secure anchorage of the staff or prop therein at the point desired. On the upper end of the staff or prop 5 is formed a substantially circular shaped ear or eye 7 to which is adjustably connected the holder for receiving the fishing rod.

The fishing rod holder comprises a substantially U-shaped frame 8 formed with reversely disposed hook ends 9 and 10 respectively for the engagement of the fishing rod therein so that said rod will be held within the holder. Formed intermediate the frame 8 is an ear 11 the latter together with the ear or eye 7 being provided with suitable holes 12 for receiving a fastener which in this instance includes a bolt 13 and a nut 14 threaded thereon, the nut being formed with wings 15 so that it can be readily turned by hand for the tightening of the bolt to secure the ears 7 and 11 together and in this manner fasten the holder upon the staff or prop in adjusted position for the engagement of the fishing rod therein to support the same.

The hook end 9 is provided with terminal lugs 16 on opposite sides of which are inner and outer shoulders 17 and 18 respectively for accommodating variable sizes of reels carried by the fishing rod. The side cheeks 19 of the reel according to the size thereof are engaged at either side of the lug 16 so that the said cheeks will rest upon the inner or outer shoulders 17 and 18 and thereby be held fast to prevent the sliding of the fishing rod in the ends 9 and 10 when in the holder.

From the foregoing description, taken in connection with the accompanying drawing, the construction and operation of the herein described support will be readily apparent, and, therefore, a more extended explanation has been omitted.

What is claimed is:

In a fishing rod support, the combination with a staff having a pointed end, of a holder comprising a substantially U-shaped frame formed with reversely disposed hook ends for the engagement of a fishing rod therein. that hook end with the open side of the hook at the top being provided with terminal lugs on opposite sides of which are formed inner and outer shoulders for engagement with different widths of reels carried by the rod, and means for attaching the frame to the staff so that it may be angularly adjusted thereon, whereby the reel may be made to secure the rod in the frame irrespective of the angle of inclination of the latter.

In testimony whereof he affixes his signature.

HENRY A. HUPPERTZ.

Witnesses:
HUGH MILLER,
THOMAS F. COURTON